(12) United States Patent
Park et al.

(10) Patent No.: US 8,713,680 B2
(45) Date of Patent: Apr. 29, 2014

(54) METHOD AND APPARATUS FOR MODELING COMPUTER PROGRAM BEHAVIOUR FOR BEHAVIOURAL DETECTION OF MALICIOUS PROGRAM

(75) Inventors: Taejoon Park, Seoul (KR); Kang Geun Shin, Ann Arbor, MI (US); Xin Hu, Ann Arbor, MI (US); Abhijit Bose, Ann Arbor, MI (US)

(73) Assignees: Samsung Electronics Co., Ltd., Suwon-si (KR); The Regents of the University of Michigan, Ann Arbor, MI (US)

( * ) Notice: Subject to any disclaimer, the term of this patent is extended or adjusted under 35 U.S.C. 154(b) by 675 days.

(21) Appl. No.: 12/106,144

(22) Filed: Apr. 18, 2008

(65) Prior Publication Data

US 2009/0019546 A1 Jan. 15, 2009

Related U.S. Application Data

(60) Provisional application No. 60/948,778, filed on Jul. 10, 2007.

(30) Foreign Application Priority Data

Sep. 7, 2007 (KR) .......................... 10 2007 0091117

(51) Int. Cl.
*H04L 29/06* (2006.01)
*G06F 21/55* (2013.01)

(52) U.S. Cl.
CPC .............. *G06F 21/55* (2013.01); *G06F 21/552* (2013.01)
USPC .......................................................... 726/24

(58) Field of Classification Search
CPC ................................. G06F 21/55; G06F 21/552
USPC ............................. 726/22, 24, 26; 729/22, 24
See application file for complete search history.

(56) References Cited

U.S. PATENT DOCUMENTS 6,775,780 B1 * 8/2004 Muttik ............................. 726/24
6,934,857 B1 * 8/2005 Bartleson et al. .................. 726/5
(Continued)

FOREIGN PATENT DOCUMENTS

KR 1020060063342 6/2006
KR 1020060106655 10/2006
(Continued)

OTHER PUBLICATIONS

Salton et al., A Vector space model for automatic indexing, Nov. 1975, ACM, Communication of the ACM vol. 18 No. 11, pp. 613-620.*

(Continued)

*Primary Examiner* — Hadi Armouche
*Assistant Examiner* — Dao Ho
(74) *Attorney, Agent, or Firm* — NSIP Law

(57) ABSTRACT

A method and apparatus for modeling a behavior of a computer program that is executed in a computer system is described. The method and apparatus for modeling a behavior of a computer program may be used to detect a malicious program based on the behavior of the computer program. A method includes collecting system use information about resources of the computer system the computer program uses; extracting a behavior signature of the computer program from the collected system use information; and encoding the extracted behavior signature to generate a behavior vector. As a result, behaviors of a particular computer program may be modeled to enable a malicious program detection program and to determine whether the computer program is either normal or malicious.

23 Claims, 8 Drawing Sheets

(56) References Cited

U.S. PATENT DOCUMENTS

| | | | |
|---|---|---|---|
| 7,093,239 B1* | 8/2006 | van der Made | 717/135 |
| 7,103,913 B2* | 9/2006 | Arnold et al. | 726/22 |
| 7,146,305 B2* | 12/2006 | van der Made | 703/22 |
| 7,818,797 B1* | 10/2010 | Fan et al. | 726/22 |
| 7,934,253 B2* | 4/2011 | Overcash et al. | 726/22 |
| 2003/0212902 A1* | 11/2003 | van der Made | 713/200 |
| 2006/0048101 A1* | 3/2006 | Krassovsky et al. | 717/127 |
| 2006/0156404 A1* | 7/2006 | Day | 726/23 |

FOREIGN PATENT DOCUMENTS

| | | |
|---|---|---|
| KR | 1020060133728 | 12/2006 |
| KR | 10-0733387 B1 | 6/2007 |

OTHER PUBLICATIONS

Korean Office Action issued Apr. 26, 2013 in counterpart Korean Application No. 10-2007-00911147 (5 pages, in Korean).

* cited by examiner

METHOD AND APPARATUS FOR MODELING COMPUTER PROGRAM BEHAVIOUR FOR BEHAVIOURAL DETECTION OF MALICIOUS PROGRAM

CROSS-REFERENCE TO RELATED APPLICATIONS

This application claims from the benefit under 35 U.S.C. §119(e) of U.S. Provisional Application No. 60/948,778, filed on Jul. 10, 2007, and from the benefit under 35 U.S.C. §119(a) of Korean Patent Application No. 10-2007-0091117, filed on Sep. 7, 2007, in the Korean Intellectual Property Office, of which the entire disclosures of both are herein incorporated by reference in their entirety.

TECHNICAL FIELD

The following description generally relates to a method and apparatus for modeling a behavior of a computer program that is executed in a computer system, and more particularly, to a method and apparatus for modeling a behavior of a computer program that can detect a malicious program based on the behavior of the computer program.

BACKGROUND

One conventional malicious program detection technology collects samples of a malicious program available to date, extracts a certain character string that is the signature of the malicious program, and determines whether a particular computer is infected with the malicious program from the existence of the extracted character string in files of the computer and the like.

Therefore, when a new malicious program is discovered, a detection program must be developed to identify the entity of the new malicious program, extract a predetermined character string that is the signature of the new malicious program, and detect the malicious program. The existing detection program may not detect the new malicious program before information about the malicious program is added; therefore, damages from the new malicious program may not be prevented. Also, the types of character strings that are the signatures of malicious programs increase in proportion to the increase in the types of malicious programs. Therefore, it takes more time for a malicious program detection program to detect the existence of the character string.

For example, in the case of a mobile device that is supplied with power using a battery and the like, such as a mobile phone, a personal digital assistant (PDA), and the like, the mobile device consumes power to extract a character string from a particular computer program and verify whether the extracted character string is the same as a character string corresponding to the signature of a malicious program. Due to the power consumption, power available to run the mobile device is inevitably reduced.

If a hacker's attacks reveal a vulnerability of a computer, a program manufacturer may guard against the hacker's attacks using a patch program associated with the vulnerability. However, there are no distinct solutions for other attacks on the underlying vulnerabilities.

Most malicious programs do not differ from existing malicious programs. Specifically, they are variants of the existing malicious programs. However, in order to detect the variants of the malicious program, a new character string that is extracted from each variant must be used instead of a character string that is extracted from the existing malicious program. Therefore, a plurality of character strings must be provided to detect a plurality of variants, respectively.

SUMMARY

In one general aspect, a method and apparatus model the behavior of a particular computer program that is executed in a computer system, and determine whether the particular computer program is malicious based on the modeled behavior.

In another general aspect, a method and apparatus enable a malicious program detection program to model the behavior of a particular computer program and to determine whether the particular computer program is malicious based on the modeled behavior.

In yet another general aspect of the present invention a method and apparatus model the behavior signature of a normal program and the behavior signature of a malicious program to train a malicious program detection program.

According to an aspect of the present invention, there is provided a method of modeling a behavior of a computer program that is executed in a computer system, the method including: collecting system use information about resources of the computer system the computer program uses; extracting a behavior signature of the computer program from the collected system use information; and encoding the extracted behavior signature to generate a behavior vector.

According to another aspect of the present invention, there is provided an apparatus for modeling a behavior of a computer program that is executed in a computer system, the apparatus including: a collector which collects system use information about resources of the computer system the computer program uses; an extractor which extracts a behavior signature of the computer program from the collected system use information; and an encoder which encodes the extracted behavior signature to generate a behavior vector.

According to the present invention, it is possible to model the behavior of a particular computer program that is executed in a computer system so that another program may determine the signature of the particular computer program.

Other features will be apparent from the detailed description, drawings, and claims.

BRIEF DESCRIPTION OF THE DRAWINGS

Throughout the drawings and the detailed description, like reference numerals refer to the like elements.

DETAILED DESCRIPTION

In the following description, the term "computer system" includes a personal computer (PC), a mobile phone, various types of digital electronic devices, and the like. For example, a computer system may be any device that includes a processor and memory, executes programs, and performs actions.

Figure 1:
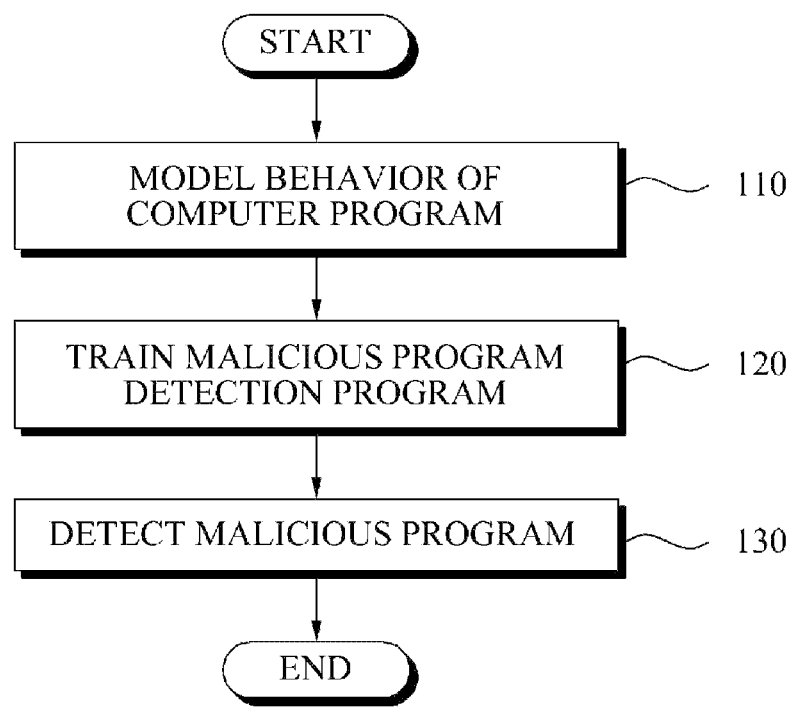
FIG. 1 is a flowchart illustrating an exemplary method of detecting a malicious program using a behavior vector of a computer program.

FIG. 1 is a flowchart illustrating one example of a method of detecting a malicious program using a behavior vector of a computer program. Hereinafter, a malicious program detection method using a modeled computer program is described in detail with reference to FIG. 1.

The term "malicious code" used herein denotes any of the programs with malicious intent or that are created to intentionally cause damage to a user and any of the types of executable programs operating on a computer system, such as a macro, a script, and the like.

As shown in FIG. 1, a behavior of a computer program is modeled and a behavior vector is generated 110. The behavior vector may be generated with respect to both a malicious program and a normal program by modeling behaviors of both the malicious program and the normal program.

A malicious program detection program is trained to discriminate the malicious program from the normal program using the generated behavior vector 120. For example, the malicious program detection program may be trained to calculate a value greater than or equal to a threshold value with respect to a behavior vector that is generated by modeling the behavior of the normal program, and to calculate a value less than the threshold value with respect to the behavior vector that is generated by modeling the behavior of the malicious program.

Each computer program that is executed in the computer system is determined as either normal or malicious using the behavior vector that is generated from the particular computer program and the trained malicious program detection program 130. When the particular computer program is normal, the malicious program detection program calculates the value to be greater than or equal to the threshold value with respect to the behavior vector of the particular computer program. Conversely, when the particular computer program is malicious, the malicious program detection program calculates the value to be less than the threshold value with respect to the behavior vector of the particular computer program.

Most malicious programs do not differ from existing malicious programs. Specifically, they are only variants of existing malicious programs that are developed by partially modifying the existing malicious programs. Although most malicious programs do not differ, conventional malicious program detection programs may not detect a variant of the existing malicious program. However, the behavior of a new malicious program may be similar to the behavior of the existing malicious program. In addition, many malicious programs are very similar in that the malicious programs invade a user's computer system and delete/alter data, system files, and the like.

Accordingly, when using the behavior of the particular computer program to determine whether the particular computer program is either normal or malicious, the malicious program may be more accurately detected when compared to conventional methods of comparing character strings. Furthermore, using the methods described herein, it is possible to determine whether the particular computer program is malicious using the behavior even in the case of an unknown new variant. In addition, unlike conventional methods, it is unnecessary to analyze information about the new malicious program. Accordingly, it is possible to reduce damages that may occur while analyzing a new malicious program.

Figure 2:
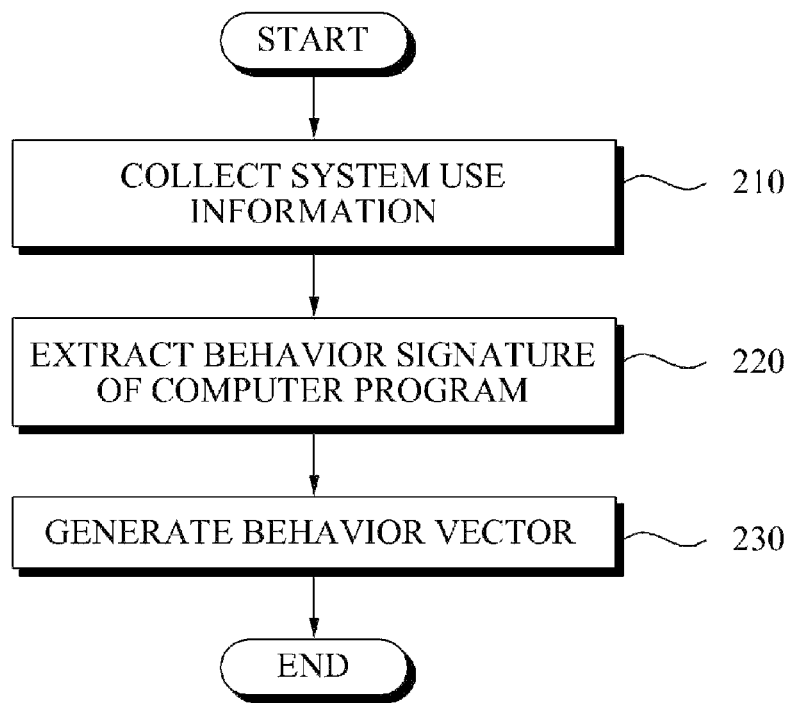
FIG. 2 is a flowchart illustrating an exemplary method of modeling a behavior of a computer program.

FIG. 2 is a flowchart illustrating an example of a method of modeling a behavior of a computer program. Hereinafter, a method of modeling the behavior of the computer program is described in detail with reference to FIG. 2.

As shown in FIG. 2, system use information is collected 210. The system use information relates to resources of a computer system that a particular computer program uses when the particular computer program is executed in a particular computer system.

In order that the computer program may be executed in the computer system, the computer program must access resources of the computer system using, for example, a file data read or write access. The computer system provides an interface function to enable the computer program to access a particular resource of the computer system. The computer system may call the interface function and access the particular resource of the computer system to perform a necessary action.

A malicious program must obtain an access authority to files storing user data or system files to destroy and/or alter the user data or the system files. Also, the malicious program must access an I/O (input/output) device to externally transmit an installation file of the malicious program if the malicious program is to infect other devices. Therefore, the system uses information about the particular resource of the computer that the computer program accesses may be used to represent the behavior of the computer program.

For example, information about an interface function called by the particular computer program may be collected as the system use information 210. The interface function is provided by the computer system. In addition to the interface function, the computer program may perform actions based on an event that is provided by the computer system. When a computer program is to perform a particular action at a certain time, the computer system generates a time event at the certain time and the computer program performs the particular action based on the time event. Also, user input, data transmission from another computer system, and the like may be transmitted by the computer system to the computer program in the form of a special event. When the computer program performs a particular action in cases where a particular input is received from a user, the computer system generates an event corresponding to the particular input, and the computer program performs the particular action based on the event.

Each computer program may verify whether the event associated with each corresponding computer program is generated by the computer system, and the computer program may perform the particular action based on the verification result. Accordingly, the actions performed by a computer program based on event generation information of the computer system associated with the computer program may be used to represent the behavior of the computer program. Therefore, event generation information associated with the computer program may be collected as system use information 210.

A behavior signature of the computer program is extracted from the collected system use information 220.

In the case of respective actions that are performed by the particular computer program, using the action to determine whether the particular computer program is either normal or malicious may be insufficient. For example, the computer program may periodically monitor whether a particular event is generated by the computer system. However, the monitoring operation alone may not be sufficient to determine whether the computer program is either normal or malicious.

A plurality of system use information may be collected at different times 210. A behavior signature of the computer program may be extracted based on the temporal precedence relation between information about the plurality of collected behaviors and actions, instead of information about an individual behavior and action of the computer program 220.

For example, when a particular computer program receives particular information from an external device or saves a particular file in a directory where system files of the computer system are stored, it may be insufficient to determine whether the particular computer program is either normal or malicious based on only the above behavior, such as receiving and saving. However, when the particular computer program receives data from an external device, then attempts to save a file in the directory where system files of the computer system are stored, and periodically transmits the saved file to the external device, there may be little doubt that the particular computer program is a malicious program.

The temporal precedence relation between the plurality of system use information may be extracted as the behavior signature of the computer program 220. A plurality of operational functions with respect to the computer program also may be generated based on the correlation between the plurality of collected system use information 220.

The computer program may perform an intent action by calling interface functions that are provided by the computer system. However, when the behavior signature of the computer program is extracted for each interface function, the process may become very complicated.

With respect to the computer program, a plurality of operational functions may be generated based on the correlation between a plurality of system use information that is related to each other, and the behavior signature of the computer program also may be extracted based on the operational functions 220.

Each of the operational functions may include at least one system use information. For example, in order to transmit data to another computer system using a wireless communication device that is installed in a computer system, a computer program may verify that the wireless communication device is installed in the computer system and that the wireless communication device is not being used by another computer program. When the wireless communication device is installed and is not being used by another computer program, the computer program may obtain an access authority to the wireless communication device, and transmit the data to the wireless communication device. When the data transmission is completed, the computer program must return the access authority to the computer system.

The process may become very complicated when the behavior signature of the computer program is extracted for each interface function for performing each corresponding action. Therefore, the process may be relatively simplified when associated system use information is constructed as an operational function and the behavior signature of the computer program is extracted based on the operational functions.

One operational function may be constructed as a plurality of interface functions that are used to verify that the wireless communication device is installed in the computer system, to obtain the access authority, to transmit data, and to return the access authority to the computer system.

The temporal precedence relation between a plurality of operational functions also may be extracted as the behavior signature 220.

Only using each operational function called by the computer program to determine whether the computer program is either normal or malicious may be insufficient. Therefore, the behavior signature of the particular computer program may be extracted based on the temporal precedence relation between the plurality of operational functions.

With respect to a portion of operational functions that are randomly selected in the course of one life-cycle of a malicious program, the temporal precedence relation between a randomly selected portion of operational functions also may be extracted as the behavior signature 220. During the life-cycle of the malicious program, the computer system is infected by the malicious program, and thereby shows symptoms of the malicious program, and infects another computer program.

The execution frequency of the generated operational function also may be extracted as the behavior signature of the computer program 220.

The execution frequency of each operational function also may be extracted as the behavior signature of the computer program 220 with respect to one life-cycle of the malicious program where the computer system is infected by the malicious program, and thereby shows symptoms of the malicious program, and infects another computer program.

Among all the operational functions that are provided by the computer system, each malicious program may call a particular operational function several times in the course of one life-cycle, or the malicious program may not call the particular operational function even once. Therefore, how frequently a particular computer program has called a particular operational function in the course of one life-cycle may be determined as the behavior signature of the particular computer program.

A behavior vector is generated by encoding the extracted behavior signature 230.

The extracted behavior signature may be not in a format that can be readily processed using the computer program, that is, the extracted behavior may be in a format, such as a flowchart, that displays the temporal precedence relation between operational functions. The behavior vector may be generated 230. In this case, the behavior vector stores the extracted behavior signature in a numerical format that can be processed by using the computer program.

The behavior vector is modeled in the format that a computer may process the behavior of the particular computer program. When using the behavior vector to determine whether the computer program is either normal or malicious, it may be practical to reason that behavior vectors that are generated by modeling behaviors of computer programs that have similar behavior signatures may be similar to each other.

Specifically, the behavior signature of a known malicious program may be similar to the behavior signature of a computer program that behaves in a similar manner as the malicious program, and the behavior vector of the malicious program may be similar to the behavior vector of the computer program that behaves in a similar manner as the malicious program. A malicious program detection program may determine a computer program to be a malicious program when the computer program has a similar behavior vector to the behavior vector of the malicious program.

Specifically, when a behavior of a first computer program is similar to a behavior of a second computer program, a first behavior signature of the first computer program may be similar to a second behavior signature of the second computer program. A first behavior vector that is generated by encoding the first behavior signature also may be similar to a second behavior vector that is generated by encoding the second behavior signature.

Encoding may be performed so that the similarity between behavior signatures may be inversely proportional to the distance between encoded behavior vectors. The distance between two behavior vectors may be an Euclidean distance. For example, the Euclidean distance z between two behavior vectors x and y may be calculated by $$z = \sqrt{\sum_{i=1}^{N}(x_i - y_i)^2}$$ [Equation 1]

where N denotes the length of the behavior vectors x, and y, $x_i$ denotes an $i^{th}$ element of the behavior vector x, and $y_i$ denotes an $i^{th}$ element of the behavior vector y.

If the behavior vector x is x=[a, b, c] and the behavior vector y is y=[d, e, f], the Euclidean distance z between the behavior vectors x and y may be calculated by $$z = \sqrt{(a-d)^2 + (b-e) + (c-f)^2}$$

If encoding is performed to reduce the distance between the behavior vectors x, and y, a value between a and d, a value between b and e, and a value between c and f must be encoded to be similar to each other. If the values are similar to each other, two behavior vectors x and y may be similar to each other.

Figure 3:
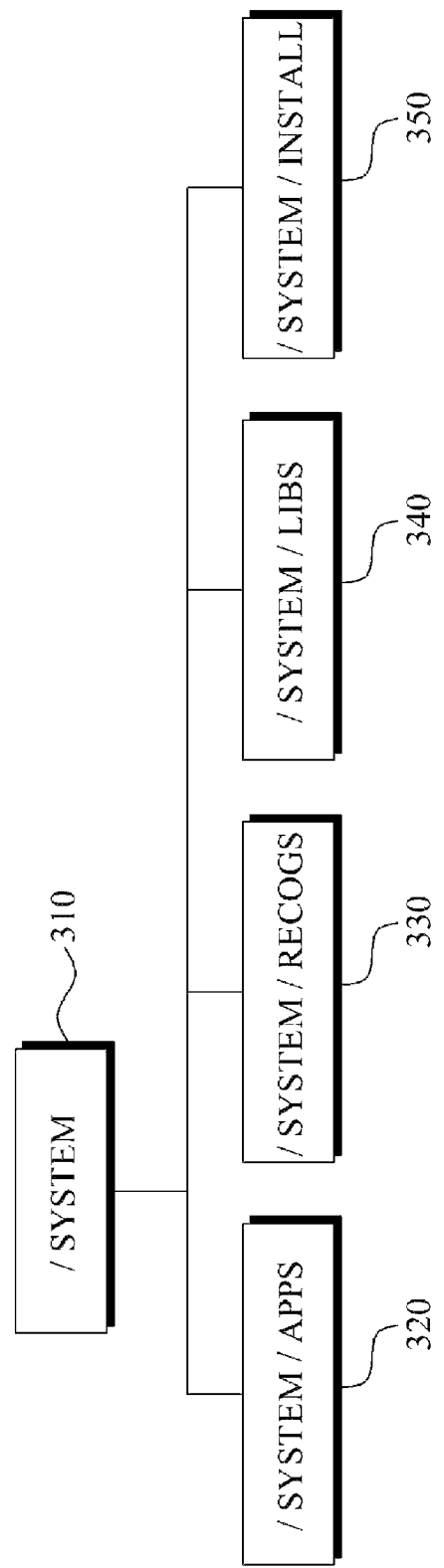
FIG. 3 illustrates an example of a file system structure of a Symbian OS that is targeted by a Commwarrior worm virus.

FIG. 3 illustrates an example of a file system structure of a Symbian operating system (OS) that is targeted by a Commwarrior worm virus, one of a number of malicious programs. Hereinafter, the file system structure of the Symbian OS is described in detail with reference to FIG. 3.

The Symbian OS is a mobile computer OS, such as for a mobile phone, a PDA, a smart phone, and the like. European mobile communication equipment manufacturers, Nokia, Sony Erikson, Siemens, and the like, established a consortium together in the year of 1998. In the consortium, they developed the Symbian OS to be independent from a computer OS of Microsoft Corporation.

The Symbian OS supports a real-time processing 32-bit multitasking OS, and $2^{nd}$ generation and $3^{rd}$ generation mobile communication networks and also supports a Multimedia Messaging System (MMS), Internet Protocol version 6 (IPv6), and Java.

The Symbian OS stores OS-related files in a system directory /System 310 and subdirectories /System/Apps 320, /System/Recogs 330, /System/libs 340, and /System/Install 350 under the system directory /System 310.

The application directory /System/Apps 320 is a subdirectory under the system directory /System 310 and is installed with various types of application programs that are executed in the Symbian OS. A malicious program that attacks an apparatus with the Symbian OS installed may, for example, store a program file in the application directory /System/Apps 320 to destroy user data or attack system files.

The automatic execution directory /System/Recogs 330 also is a subdirectory under the system directory /System 310 and stores files that are automatically executed every time the apparatus with the Symbian OS installed is rebooted.

The library directory /System/libs 340 stores interface functions in a format of library files. The interface functions are needed when application programs perform actions.

The installation directory /System/Install 350 stores files that are additionally installed in the Symbian OS. An execution file that is extracted from the installation file stored in the installation directory /System/Install 350 is stored in the application directory /System/Apps 320.

A user may store an installation file of a particular application program in the installation directory /System/Install 350 to install the particular application program. The malicious program also may store its installation file in the installation directory /System/Install 350 to reproduce the malicious program. Therefore, it may be insufficient to determine whether the computer program is either normal or malicious based only on the behavior of copying the particular file in the installation directory /System/Install 350.

Also, even when the computer program transmits a file stored in the installation directory /System/Install 350 to another computer system, it also may be insufficient to determine whether the computer program is either normal or malicious based on only the behavior of the computer program that attempts to transmit the file.

However, if the computer program attempts to copy the installation file received from an external device of the computer system in the installation directory /System/Install 350 and the computer program also attempts to transmit the copied installation file to another computer system, the computer program may be determined to be a malicious program.

Figure 4:
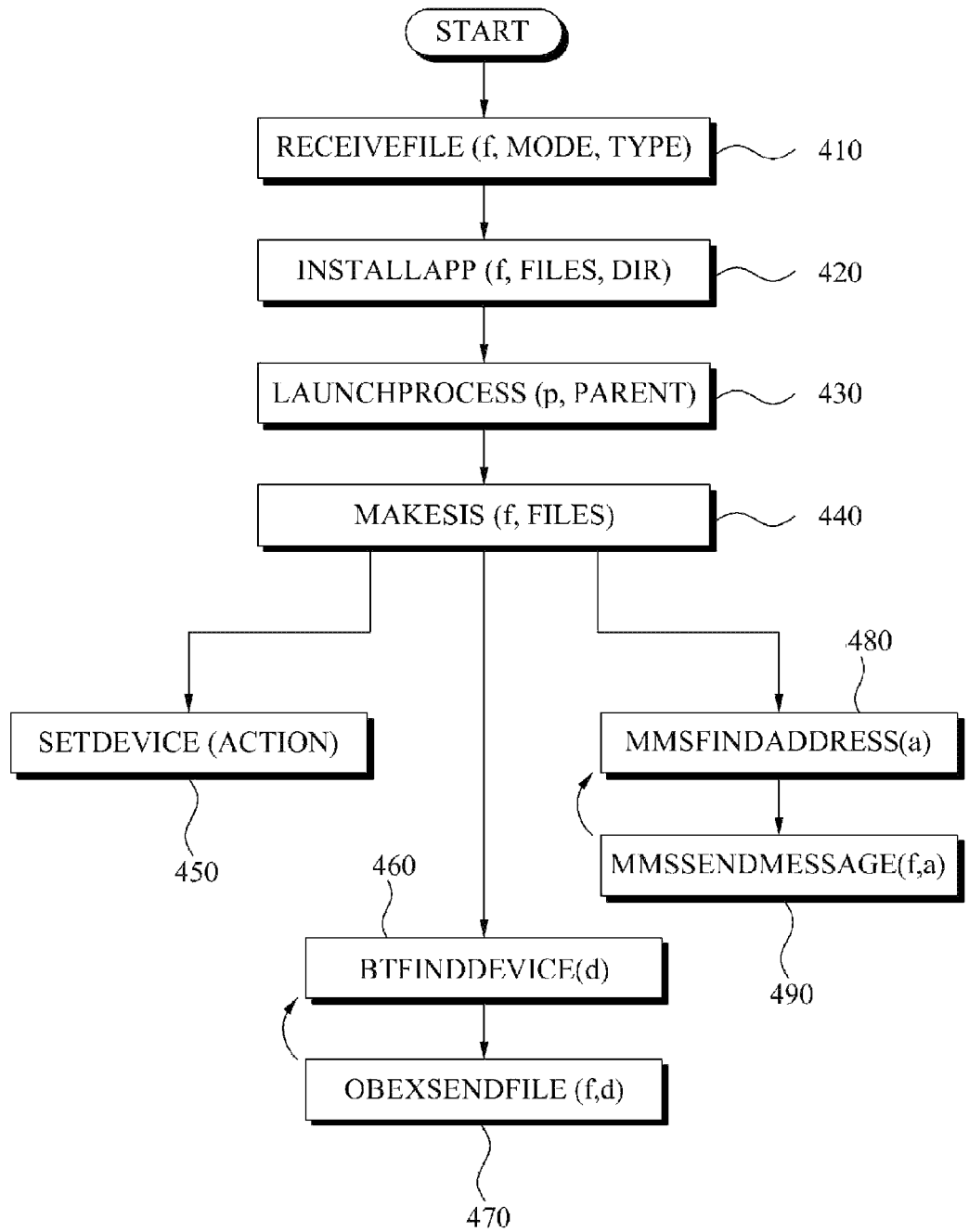
FIG. 4 illustrates an example of the behavior signature of a Commwarrior worm virus.

FIG. 4 illustrates an example of the behavior signature of a Commwarrior worm virus that is one of a number of malicious programs. Hereinafter, the behavior signature of the Commwarrior worm virus is described in detail with reference to FIG. 4.

In FIG. 4, the behavior signature of the Commwarrior worm virus is illustrated using a plurality of operational functions.

In operation 410, an operational function 'ReceiveFile(f, mode, type)' is executed. The function 'ReceiveFile' enables an apparatus installed with the Symbian OS to receive an installation file of the Commwarrior worm virus from another apparatus. 'f', 'mode', and 'type' are specific elements of the 'ReceiveFile' function. The element 'f' denotes a file name of a file that the operational function receives, and the element 'mode' denotes a method in which the operational function receives the file. As an example of a wireless communication method, when 'mode'='Bluetooth', the Symbian OS apparatus receives the installation file of the Commwarrior worm virus using a Bluetooth module that is installed in the apparatus. When 'mode'='MMS', the apparatus receives the installation file of the Commwarrior worm virus using an MMS. The element 'type' denotes a format of the received file. Since the operational function 'ReceiveFile' receives the installation file of the Commwarrior worm virus, the file type is 'SIS' that is a format of installation files of the Symbian OS.

In operation 420, an operational function 'InstallApp(f, files, dir)' is executed. The function 'InstallApp' installs the installation file of the received Commwarrior worm virus in a particular directory. 'f', 'files', and 'dir' are specific elements of the function 'InstallApp'. The element 'f' denotes the installation file of the Commwarrior worm virus, and the element 'files' denotes an execution file of the Commwarrior worm virus that is extracted from the installation file. The element 'dir' denotes a directory where the execution file of the Commwarrior worm virus is copied. For example, in the case of the Commwarrior worm virus, the system directory /System 310 or subdirectories /System/Apps 320, /System/Recogs 330, /System/libs 340, and /System/Install 350 under the system directory /System 310 are the element 'dir'.

In operation 430, an operational function 'LaunchProcess (p, parent)' is executed. The function 'LaunchProcess' launches a particular application. 'p' and 'parent' are elements of the function 'LaunchProcess'. The element 'p' denotes an application to be executed. For example, in the case of the Commwarrior worm virus, the execution file of the Commwarrior worm virus corresponds to the element 'p'. The element 'parent' is another application that executes the particular application. For example, in the case of the Commwarrior worm virus, a Symbian Installer of the Symbian OS corresponds to the element 'parent'.

In operation 440, an operational function 'MakeSIS(f, files)' is executed. The function 'MakeSIS' creates the installation file from the execution file. 'f' and 'files' are elements of the function 'MakeSIS'. The element 'f' is the installation file that is created from the execution file and the element 'files' is the execution file.

In operation 450, an operational function 'SetDevice(action)' is executed. The function 'SetDevice' performs a particular action that is instructed by the Commwarrior worm virus. The instructed action is transferred to the function 'SetDevice' using the element 'action'.

In operation 460, an operational function 'BTFindDevice (d)' is executed. The function 'BTFindDevice' verifies whether a Bluetooth transmission apparatus exists in the Symbian OS apparatus. The Commwarrior worm virus is transferred to the function 'BTFindDevice' using the element 'd' that denotes an identifier of the Bluetooth transmission apparatus.

In operation 470, an operational function 'OBEXSendFile (f, d)' is executed. The function 'OBEXSendFile' transmits data to an external device. The Commwarrior worm virus transfers a name of a file to be externally transmitted to the operational function 'OBEXSendFile' using the element 'f', and transfers an identifier of a file transmission apparatus using the element 'd'. The Commwarrior worm virus transmits the installation file that is generated in operation 440 to the external device using the element 'f'. The Commwarrior worm virus may transmit the installation file of the Commwarrior worm virus to another apparatus using the operational function 'OBEXSendFile', and infect the other apparatus that receives the file.

In operation 480, an operational function 'MMSFindAddress(a)' is executed. The function 'MMSFindAddress' looks up a random phone number in a phonebook list that is stored in the Symbian OS, and transfers the found phone number to the Commwarrior worm virus.

In operation 490, an operational function 'MMSSendMessage(f, a)' is executed. The function 'MMSSendMessage' transmits a file to another apparatus corresponding to the phone number found using an MMS service. The Commwarrior worm virus transfers the found phone number to the function 'MMSSendMessage' using the element 'a', and transfers the name of the file to be transmitted to the external device using the element 'f'. The Commwarrior worm virus may infect an apparatus by transmitting the installation file of the Commwarrior worm virus to the apparatus that corresponds to the found phone number using the function 'MMSSendMessage'.

The behavior signature of a particular function includes the temporal precedence relation between a plurality of operational functions. Therefore, the behavior signature is generally represented as the flowchart shown in FIG. 4. However, a malicious program detection program may not recognize the behavior signature as described with reference to FIG. 4. Therefore, a behavior vector may be generated by encoding the behavior signature of FIG. 4 in a format consisting of a character string or numerals, so that the computer program may process the behavior signature.

Figure 5:
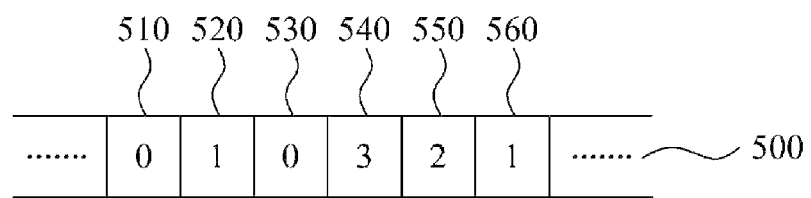
FIG. 5 illustrates an example of a structure of a behavior vector for storing an execution frequency of an operational function.

FIG. 5 illustrates an example of a structure of a behavior vector for storing the execution frequency of an operational function. Hereinafter, the structure of the behavior vector is described in detail with reference to FIG. 5.

If an operational function that serves as a basic unit to extract the behavior signature of a computer program changes every time the behavior signature of the computer program is extracted, it may not be useful to help discriminate a malicious program from a normal program based on the extracted behavior signature. Therefore, the operational function that serves as the basic unit to extract the behavior signature is constructed irrespective of respective computer programs.

When constructing, as the operational function, functions that are associated with each other among all the interface functions provided by the computer system, the operational function may be constructed irrespective of respective computer programs.

When the operational function is constructed with respect to all the interface functions that are provided by the computer system, a total number of operational functions may differ depending on a particular computer system. For example, a particular computer program performs actions using only a portion of the entire operational functions. Specifically, the particular computer program may use a particular operational function several times or only once to perform an action and may not use another particular operational function.

A behavior vector that is generated by encoding the behavior signature may include a plurality of elements that corresponds to a plurality of operational functions respectively. Each of the elements may store the execution frequency of each corresponding operational function.

All the operational functions that are provided from a computer system may be sorted according to a predetermined criterion. If it is assumed that the computer system provides N operational functions, identifiers from '1' to 'N' may be assigned to the operational functions respectively. N elements are needed to represent the execution frequency of all N operational functions that are provided by the computer system.

Among a plurality of elements 510, 520, 530, 540, 550, and 560 of a behavior vector 500, element 510 corresponding to a first operational function may store the execution frequency of the first operational function and element 520 corresponding to a second operational function may store the execution frequency of the second operational function. Specifically, an element corresponding to an $N^{th}$ operational function may store the execution frequency of the $N^{th}$ operational function by using the above-described method.

Referring to FIG. 5, the behavior vector 500 indicates that a computer program has not called the first operational function and a third operational function from among the operational functions that are provided by the computer system, as shown by the elements 510 and 530. The behavior vector 500 indicates that the computer program has called the second operational function and a sixth operational function once as shown by the elements 520 and 560, a fourth operational function has been called three times as shown by the element 540, and a fifth operational function has been called twice as shown by the element 550.

Elements of a behavior vector for storing the execution frequency of operational functions respectively may be disposed to be adjacent to each other in the behavior vector, and the elements also may be spaced apart from each other.

Elements of a behavior vector for storing the execution frequency of operational functions respectively may be the first N elements of the behavior vector or the last N elements of the behavior vector.

Figure 6A:
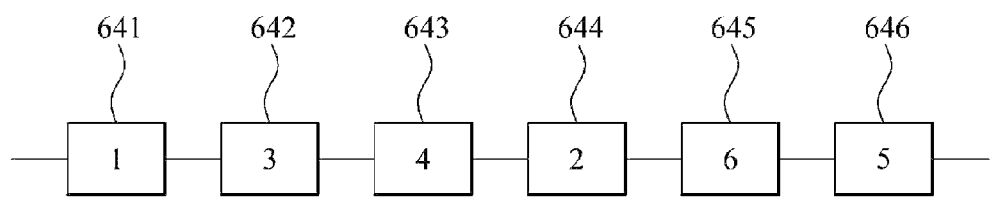
FIGS. 6A and 6B illustrate an example of a structure of a behavior vector for storing the temporal precedence relation between operational functions.
Figure 6B:
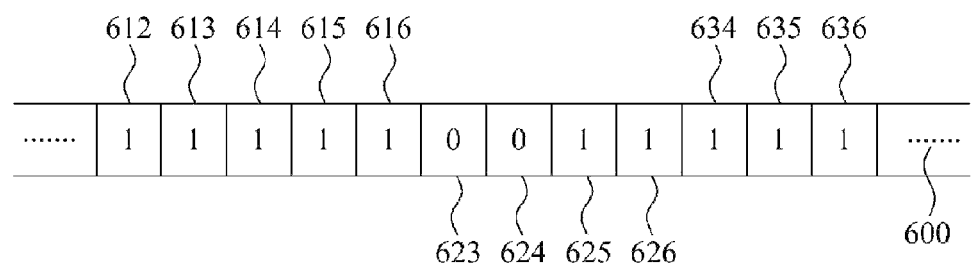

FIGS. 6A and 6B illustrate an example of a structure of a behavior vector for storing the temporal precedence relation between operational functions. Hereinafter, the structure of the behavior vector is described in detail with reference to FIGS. 6A and 6B.

In order to model a behavior of a particular computer program, it is important which operational function is called and how frequently the computer program has called it; in addition, the temporal precedence relation between called operational functions also is important.

A behavior vector that is generated by encoding the behavior signature of a computer program may include a plurality of elements that respectively corresponds to random combinations of two random operational functions from among a plurality of operational functions. Each of the elements may store the temporal precedence relation between the two operational functions.

FIG. 6A illustrates an example of a process in which a particular computer program sequentially calls operational functions that are provided by a computer system and performs an action.

As shown in FIG. 6A, the computer program sequentially calls a first operational function 641, a third operational function 642, a fourth operational function 643, a second operational function 644, a sixth operational function 645, and a fifth operational function 646 and performs an action.

If the computer program calls the operational functions in a predetermined order as shown in FIG. 6A, the behavior signature of the computer program may be sufficiently described by only encoding the called order between operational functions that are temporally adjacent to each other. However, while the computer program being executed, if the computer program calls a different operational function or calls operational functions in a different order when considering a particular variable, the behavior signature of the computer program may be described by encoding all the called orders between each operational function and each of other operational functions.

Referring to FIG. 6B, the temporal precedence relation between two operational functions is stored in an element corresponding to a combination of the two operational functions among a plurality of elements 612, 613, 614, 615, 616, 623, 624, 625, 626, 634, 635, and 636 of a behavior vector 600.

The element 612 corresponding to the combination of a first operational function and a second operational function may store the temporal precedence relation between the first operational function and the second operational function. Each element that stores the temporal precedence relation between operational functions may have a binary value, such as a '0' and a '1'. When a particular operational function is initially called before another operational function, a '1' may be stored in an element corresponding to the combination of the particular operational function and the other operational function. When the particular operational function is subsequently called after the other operational function, a '0' may be stored in the corresponding element.

Referring to the example shown in FIG. 6B, a computer program initially called the first operational function and then called the second operational function. Therefore, a '1' is stored in the element 612 corresponding to the combination of the first operational function and the second operational function. Since the first operational function is initially called, a '1' may be stored in all of the elements 613, 614, 615, and 616. The element 613 stores the temporal precedence relation between the first operational function and a third operational function, the element 614 stores the temporal precedence relation between the first operational function and a fourth operational function, the element 615 stores the temporal precedence relation between the first operational function and a fifth operational function, and the element 616 stores the temporal precedence relation between the first operational function and a sixth operational function.

The second operational function is called after the third operational function and the fourth operational function. Therefore, a '0' is stored in the element 623 that corresponds to the temporal precedence relation between the second operational function and the third operational function, and a '0'' is stored in the element 624 that corresponds to the temporal precedence relation between the second operational function and the fourth operational function.

The second operational function is called before the fifth operational function and the sixth operational function. Therefore, a '1' is stored in the element 625 that corresponds to the temporal precedence relation between the second operational function and the fifth operational function, and a '1' is stored in the element 626 that corresponds to the temporal precedence relation between the second operational function and the sixth operational function.

The temporal precedence relation between the third operation and each of the fourth, the fifth, and the sixth operational functions may be stored in the respective elements 634, 635, and 636.

According to an aspect of the present invention, when N operational functions are provided from a computer system, a total of N−1 elements may be used to represent the temporal precedence relation between the first operational function and remaining operational function. Also, a total of N−2 elements may be used to represent the temporal precedence relation between the second operational function and the remaining operational function excluding the first operational function. Also, a total of N−3 elements may be used to represent the temporal precedence relation between the third operational function and the remaining operational function excluding the first and the second operational functions. Therefore, the behavior vector may use N(N−1)/2 elements to represent all the temporal precedence relation among the N operational functions that are provided by the computer system.

Figure 7:
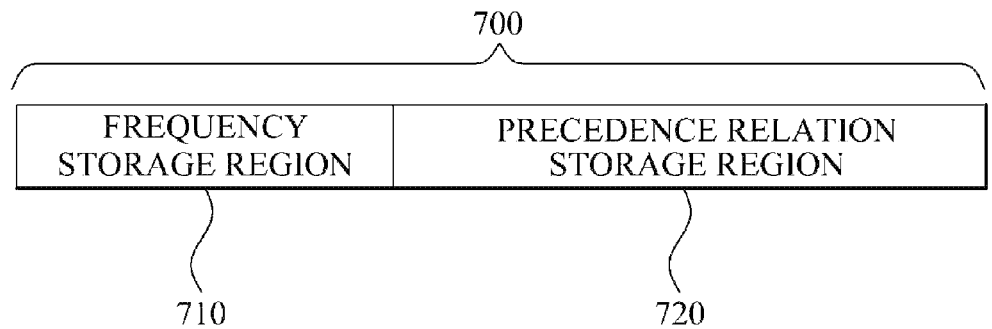
FIG. 7 illustrates an example of a data frame structure for storing a behavior vector.

FIG. 7 illustrates an example of a data frame structure for storing a behavior vector.

Referring to FIG. 7, the behavior vector may include a frequency storage region 710 and a precedence relation storage region 720. Hereinafter, the structure of the behavior vector is described in detail with reference to FIG. 7.

The behavior signature of a particular computer program may include an execution frequency of how frequently each operational function is called and executed and the temporal precedence relation between operational functions. Accordingly, both the execution frequency of each operational function and the temporal precedence relation between each operational function is represented to enable a behavior vector to accurately manifest the behavior of a particular computer program.

The behavior vector 700 may include the frequency storage region 710 that stores the execution frequency of an operational function called by the computer program. The behavior vector 700 may include the precedence relation storage region 720 that stores the temporal precedence relation between operational functions called by the computer program.

When N operational functions are provided by the computer system, the behavior vector may use N elements to store the execution frequency of the N operational functions, respectively. The behavior vector also may use N(N−1)/2 elements to represent all the temporal precedence relation among the N operational functions, respectively. Therefore, the behavior vector may use N(N+1)/2 elements to represent the execution frequency of the operational functions and the temporal precedence relation between the operational functions, respectively.

Referring to FIG. 7, the frequency storage region 710 is included in an initial part of the behavior vector 700, and the precedence relation storage region 720 follows the frequency storage region 710. However, the locations of the regions may be switched. In FIG. 7, the frequency storage region 710 is immediately followed by the precedence relation storage region 720 in the behavior vector 700. However, the frequency storage region 710 and the precedence relation storage region 720 may be spaced apart from each other.

Figure 8:
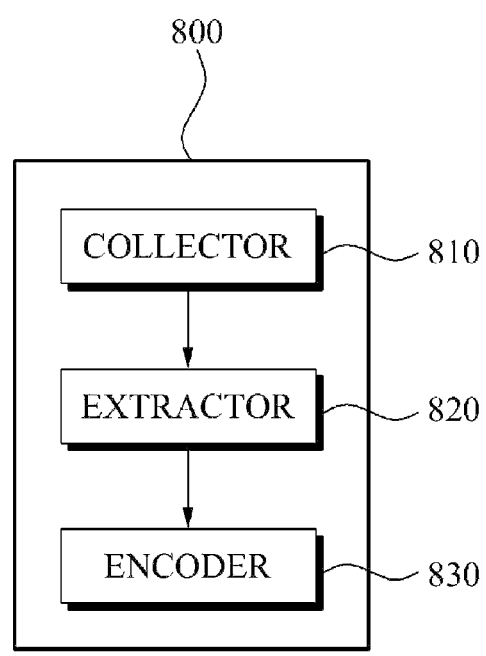
FIG. 8 is a block diagram illustrating a structure of an exemplary apparatus for modeling a behavior of a computer program.

FIG. 8 is an exemplary block diagram illustrating a structure of an apparatus for modeling a behavior of a computer program. Hereinafter, the structure of a modeling apparatus 800 is described in detail with reference to FIG. 8.

The modeling apparatus includes a collector 810, an extractor 820, and an encoder 830.

The collector 810 collects system use information about the resources used by a computer system. The computer program is executed in the computer system. The computer program must access resources of the computer system, for example, memory, files, and the like, to be executed by the computer system and perform actions for the computer system. The computer system provides interface functions to enable the computer program to access the various types of resources in the computer system. The computer program accesses the resources of the computer system using the interface functions and performs actions using the accessed resources.

The system use information may include information about an interface function called by the computer program. As described above, the interface function is provided by the computer system.

The computer program may perform actions based on an event that also is generated in the computer system. For example, user input, data transmission from another computer system, and the like may be transmitted by the computer system to the computer program in a form of a special event.

Each computer program may verify whether the event associated with each corresponding computer program is generated by the computer system, and the computer program may perform a particular action based on the verification result. The system use information may include event generation information of the computer system associated with the computer program.

The extractor 820 extracts the behavior signature of the computer program from the collected system use information. However, the collected system use information may be insufficient to model the behavior of the computer program. For example, even when the computer program attempts to copy a file in a system directory, determining whether the computer program is either normal or malicious may not be possible. The malicious program may copy a program for manipulating the computer system in the directory where the system files are stored, whereas the normal program also may copy a file in the directory where the system files are stored in order to improve the performance of the computer system.

However, when the particular computer system receives data from an external device, then attempts to copy a file in the directory where the system files are stored, and periodically transmits the copied file to the external device, there may be little doubt that the particular computer program is a malicious computer program. Therefore, instead of extracting each of a plurality of system use information, the temporal precedence relation between the plurality of use information may be extracted as the behavior signature of the computer program.

The collector 810 may collect a plurality of system use information at different times, and the extractor 820 may extract the behavior signature of the computer program based on the temporal precedence relation between the plurality of collected system use information. The extractor 820 may generate a plurality of operational functions with respect to the computer program based on the correlation between the plurality of collected system use information.

The computer program may call interface functions of the computer system to perform actions. However, it may be inappropriate to extract the behavior signature of the computer program for each interface function. For example, in order to transmit data to another computer system using a wireless communication device that is installed in a computer system, the computer program may verify that the wireless communication device is installed in the computer system and that the wireless communication device is not being used by another computer program. When the wireless communication device is installed in the computer system and is not being used by the other computer program, the computer program may obtain an access authority to the wireless communication device and transmit the data to the wireless communication device. When the data transmission is over, the computer program returns the access authority to the computer system.

The process may become very complicated when the behavior signature of the computer program is extracted for each interface function for performing each corresponding action. Therefore, the process may be relatively simplified when the associated system use information is constructed as an operational function and the behavior signature of the computer program is extracted based on the operational function.

If an operational function that serves as a basic unit to extract the behavior signature of a computer program changes every time the behavior signature of the computer program is extracted, it may be unimportant to discriminate a malicious program from a normal program based on the extracted behavior signature. Therefore, the operational function that serves as the basic unit to extract the behavior signature must be constructed regardless of respective computer programs.

When constructing, as the operational function, functions that are associated with each other among all the interface functions provided by the computer system, the operational function may be constructed regardless of respective computer programs.

The extractor 820 may generate a plurality of operational functions with respect to the computer program based on the correlation between the collected system use information. For example, Among all the operational functions that are provided by the computer system, each malicious program may call a particular operational function, several times in the course of one life-cycle, or the malicious program may not call the particular operational function even once. Therefore, how frequently a particular computer program has called a particular operational function in the course of one life-cycle may be determined as the behavior signature of the particular computer program.

The extractor 820 may extract the execution frequency of each of the generated operational functions as the behavior signature of the computer program. The extractor 820 also may extract the temporal precedence relation between the plurality of operational functions as the behavior signature of the computer program.

The encoder 830 encodes the extracted behavior signature and generates the behavior vector. However, the extracted behavior signature is not in a format that can be readily processed using the computer program. Therefore, the encoder 830 encodes the extracted behavior signature in a format that the computer program may process and generates the behavior vector.

The behavior vector represents the behavior signature of the computer program. Therefore, if the behavior of the computer program is similar to the behavior of another computer program, the behavior vectors of the computer programs may be similar to each other.

When the behavior signature of a first computer program is similar to the behavior signature of a second computer program, first system use information corresponding to the first computer program may be similar to second system use information corresponding to the second computer program. The first system use information and the second system use information are collected by the collector 810.

When the first system use information is similar to the second system use information, a first behavior signature corresponding to the first system use information may be similar to a second behavior signature corresponding to the second system use information.

When the first behavior signature is similar to the second behavior signature, a first behavior vector corresponding to the first behavior signature may be similar to a second behavior vector corresponding to the second behavior signature. The first behavior vector is generated by encoding the first behavior signature using the encoder 830. The second behavior vector is generated by encoding the second behavior signature using the encoder 830.

The encoder 830 may encode the first behavior vector and the second behavior vector so that the similarity between the first behavior signature and the second behavior signature is inversely proportional to the distance between the first behavior vector corresponding to the first behavior signature and the second behavior vector corresponding to the second behavior signature. Two behavior vectors that are generated by encoding two similar behavior signatures are adjacently located; therefore, the behavior vectors are similar to each other.

The extractor 820 may extract the execution frequency of each operational function with respect to one life-cycle of a malicious program as the behavior signature. The life-cycle may be defined as a period of time in which the malicious program infects a particular computer system, shows symptoms of the malicious program, such as destruction of user data or system data, and infects another computer system.

Each malicious program may call a particular operational function among all the operational functions that are provided by the computer system in the course of one life-cycle several times, or the malicious program may not call the particular operational function even once. Therefore, how frequently a particular computer program has called a particular operational function in the course of one life-cycle may be determined as the behavior signature of the particular computer program.

The encoder 830 may include in the behavior vector a plurality of elements that correspond to a plurality of operational functions, respectively. Each of the elements may store the execution frequency of each corresponding operational function.

According to an aspect of the present invention, when N operational functions are provided by the computer system, the extractor 820 may include N elements in the behavior vector. N elements store the execution frequency of the N operational functions, respectively.

The behavior vector generated by the encoder 830 may include a plurality of elements that respectively correspond to combinations of two random operational functions among the plurality of operational functions. Each of the elements may store the temporal precedence relation between the two operational functions.

The encoder 830 may enable each element storing the temporal precedence relation between operational functions to have a binary value, such as a '0' and a '1'.

The encoder 830 may sort all the operational functions that are provided by a computer system according to a predetermined criterion. If it is assumed that the computer system provides N operational functions, identifiers from '1' to 'N' may be assigned to the operational functions, respectively. When N operational functions are provided by the computer system, the encoder 830 may provide N−1 elements in the behavior vector to store the temporal precedence relation between the first operational function and remaining N−1 operational functions. The encoder 830 may provide N−2 elements in the behavior vector to store the temporal precedence relation between the second operational function and the remaining N−2 operational functions, excluding the first operational function. When N operational functions are provided by the computer system, the encoder 830 may provide $N(N-1)/2$ elements in the behavior vector to represent all of the temporal precedence relations among the N operational functions, respectively.

The modeling method described above may be implemented as one or more program instructions that can be executed by various types of computer devices and may be recorded in various computer-readable media.

Also, the data frame for storing the behavior vector as described above may be recorded in recording media that are readable by various types of computer devices.

The media may include, alone or in combination with the program instructions, data files, data structures, and the like. Examples of computer-readable media include magnetic media, such as hard disks, floppy disks, and magnetic tape; optical media, such as CD ROM disks and DVD; magneto-optical media, such as optical disks; and hardware devices that are specially configured to store and perform program instructions, such as read-only memory (ROM), random access memory (RAM), flash memory, and the like. Examples of program instructions include both machine code, such as those produced by a compiler, and files containing higher level code that may be executed by the computer using an interpreter. The described hardware devices may be configured to act as one or more software modules in order to perform the operations described above.

Although a few exemplary embodiments have been shown and described herein, it will be understood that various modifications may be made. For example, suitable results may be achieved if the described techniques are performed in a different order and/or if elements in the described systems and devices are combined in a different manner and/or replaced or supplemented by other components or their equivalents. Accordingly other implementations are within the scope of the following claims.

What is claimed is:

1. A method of modeling a behavior of a computer program that is executed in a computer system with a hardware processor configured to model the behavior of the computer program, the method comprising:

the processor collecting system use information about resources of the computer system that the computer program is configured to use, wherein the collecting of the system use information includes collecting a plurality of system use information at different times;

extracting the behavior signature includes generating a plurality of operational functions about the computer program based on a correlation between the plurality of collected system use information;

the processor extracting a first and second behavior signature of the computer program from the collected system use information; and the processor encoding the extracted first and second behavior signature to generate a first and second behavior vector wherein encoding includes encoding a similarity between the first behavior signature and the second behavior signature that is inversely proportional to a distance between the first behavior vector corresponding to the first behavior signature and the second behavior vector corresponding to the second behavior signature wherein the first behavior signature of the computer program is data used to train a malicious program detection program to discriminate a malicious program from a normal program;

wherein encoding the extracted behavior signature to generate the behavior vector includes encoding a plurality of elements that respectively corresponds to combinations of two random operational functions among the plurality of operational functions, and storing a temporal precedence relation between the two operational functions in each of the elements.

2. The method of claim 1, wherein collecting the system use information includes collecting information about an interface function provided by the computer system that is called by the computer program.

3. The method of claim 1, wherein collecting the system use information includes collecting event generation information of the computer system associated with the computer program.

4. The method of claim 1, wherein extracting the behavior signature includes extracting an execution frequency of each of the extracted operational functions.

5. The method of claim 1, wherein extracting the behavior signature includes extracting a temporal precedence relation between the plurality of operational functions.

6. The method of claim 1, wherein encoding the extracted behavior signature to generate the behavior vector includes encoding a plurality of elements that corresponds to the plurality of operational functions, and storing the execution frequency of each corresponding operational function in each of the elements.

7. The method of claim 1, wherein encoding the plurality of elements includes encoding a binary value for each of the elements.

8. The method of claim 1 further comprising:
using the generated behavior vector to detect a malicious program.

9. The method of claim 1 further comprising using the generated behavior vector to detect an unknown variant of a known malicious program.

10. The method of claim 1 further comprising:
comparing the generated behavior vector to a behavior vector of a known malicious program; and
determining whether the computer program is a malicious program based on the comparison.

11. An apparatus configured to model a behavior of a computer program that is executed in a computer system with a hardware processor, the apparatus comprising:
a memory device;
a collector configured to collect system use information about resources of the computer system the computer program uses, wherein the collecting of the system use information includes collecting a plurality of system use information at different times;

extracting the behavior signature includes generating a plurality of operational functions about the computer program based on a correlation between the plurality of collected system use information;

an extractor configured to extract a first and second behavior signature of the computer program from the collected system use information; and an encoder configured, using at least one processor, to encode the extracted first and second behavior signature to generate a first and second behavior vector wherein encoding includes encoding a similarity between the first behavior signature and the second behavior signature that is inversely proportional to a distance between the first behavior vector corresponding to the first behavior signature and the second behavior vector corresponding to the second behavior signature wherein the first behavior signature of the computer program is data used to train a malicious program detection program to discriminate a malicious program from a normal program;

wherein the behavior vector includes a plurality of elements that respectively corresponds to combinations of two random operational functions among the plurality of operational functions, and each of the elements stores a temporal precedence relation between the two operational functions.

12. The apparatus of claim 11, wherein the system use information includes information about an interface function provided by the computer system that is called by the computer program.

13. The apparatus of claim 11, wherein the system use information includes event generation information of the computer system associated with the computer program.

14. The apparatus of claim 11, wherein the extractor extracts an execution frequency of each of the extracted operational functions as the behavior signature.

15. The apparatus of claim 11, wherein the extractor extracts a temporal precedence relation between the plurality of operational functions as the behavior signature.

16. The apparatus of claim 11, wherein the behavior vector includes a plurality of elements that corresponds to the plurality of operational functions respectively, and each of the elements stores the execution frequency of each corresponding operational function.

17. The apparatus of claim 11, wherein each of the elements has a binary value.

18. The apparatus of claim 11, wherein the encoder encodes a similarity between a first behavior signature and a second behavior signature that is inversely proportional to a distance between a first behavior vector corresponding to the first behavior signature and a second behavior vector corresponding to the second behavior signature.

19. The apparatus of claim 11 wherein the generated behavior vector detects a malicious program.

20. The apparatus of claim 11 wherein the generated behavior vector detects an unknown variant of a known malicious program.

21. The apparatus of claim 11 wherein the generated behavior vector is compared to a behavior vector of a known malicious program to determine whether the computer program is a malicious program.

22. The apparatus of claim 11 wherein the apparatus is a mobile computing device.

23. A non-transitory computer-readable recording medium configured to store a program configured to implement a method of modeling a behavior of a computer program that is executed in a computer system, the program including instructions:
- configured to cause a computer to collect system use information about resources of the computer system the computer program uses, wherein the collecting of the system use information includes collecting a plurality of system use information at different times;
- extracting the behavior signature includes generating a plurality of operational functions about the computer program based on a correlation between the plurality of collected system use information;
- configured to extract a first and second behavior signature of the computer program from the collected system use information; and
- configured to encode the extracted first and second behavior signature to generate a first and second behavior vector wherein encoding includes encoding a similarity between the first behavior signature and the second behavior signature that is inversely proportional to a distance between the first behavior vector corresponding to the first behavior signature and the second behavior vector corresponding to the second behavior signature wherein the first behavior signature of the computer program is data used to train a malicious program detection program to discriminate a malicious program from a normal program;
- wherein encoding the extracted behavior signature to generate the behavior vector includes encoding a plurality of elements that respectively corresponds to combinations of two random operational functions among the plurality of operational functions, and storing a temporal precedence relation between the two operational functions in each of the elements.

* * * * *